May 22, 1956
C. B. SCHNEIBLE ET AL  2,746,743
CUPOLA FURNACE PROVIDED WITH MEANS TO PRODUCE
A GASEOUS CURTAIN IN ITS OPENING
Filed Feb. 6, 1953
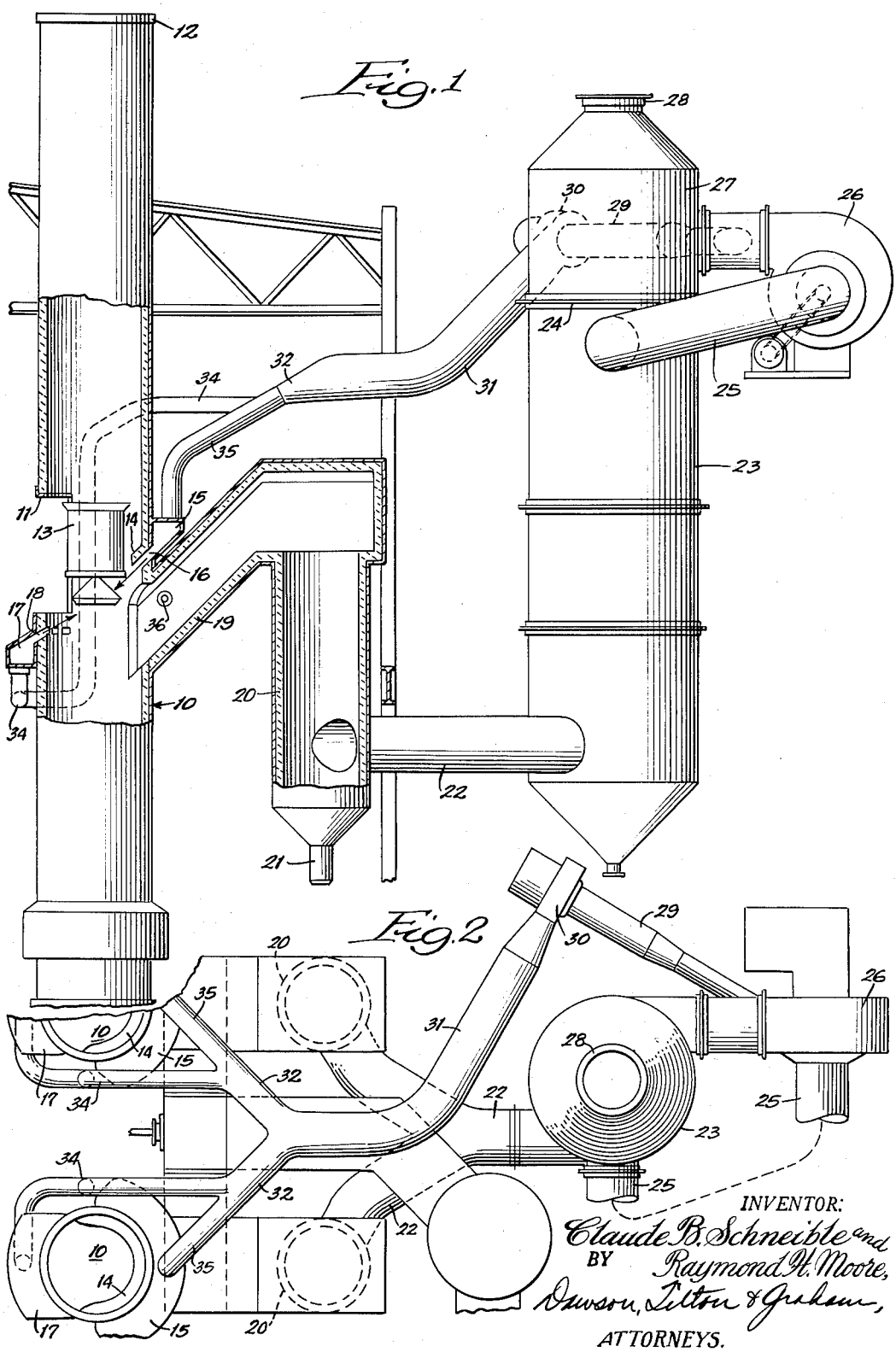
INVENTOR:
Claude B. Schneible and
BY Raymond H. Moore,
Dawson, Tilton & Graham,
ATTORNEYS.

United States Patent Office

2,746,743
Patented May 22, 1956

2,746,743

CUPOLA FURNACE PROVIDED WITH MEANS TO PRODUCE A GASEOUS CURTAIN IN ITS OPENING

Claude B. Schneible, Detroit, and Raymond H. Moore, Birmingham, Mich., assignors to Claude B. Schneible Company, Inc., Detroit, Mich., a corporation of Michigan Application February 6, 1953, Serial No. 335,526

8 Claims. (Cl. 266—17)

This invention relates to cupola gas curtains, and the like, and more particularly to the recycling of the products of combustion and the use thereof, or a portion thereof, in forming a gas curtain about the inlet opening of the cupola, etc.

Heretofore it has been rather difficult, in designing cupola equipment, to determine the character and quantity of the products of combusion from cupola melting because of the many variable conditions such as, for example, the melting ratio which may vary from four pounds of iron to one pound of coke, to as high as thirteen pounds of iron per one pound of coke. Without any iron in the charge, the cupola would operate as a gas producer in which very high temperatures are obtained by combustion at the base of a high column of fuel and the excess heat energy developed at the hottest point of combustion supplies the heat energy to convert the carbon dioxide of the products of combustion to carbon monoxide, combining with the additional molecules of carbon in an endothermic reaction.

When iron is mixed with the fuel and as the fuel is consumed at the base of the stack, much of the excess heat is utilized in preheating and melting and superheating the iron, and is not available to supply the heat energy for the endothermic reaction in reducing the carbon dioxide to carbon monoxide, and the iron actually arrests the cycle of the combustion reaction of the oxygen in the air and the carbon of the coke at a point at which the gas analysis is reasonably definite, as to a monoxide or dioxide content and each iron to carbon ratio.

In order to apply equipment in general for handling the products of combustion, it is necessary to determine the character of the gas, because should this gas ignite in the duct work and combustion chamber prior to entering apparatus such as wet scrubbing apparatus, dust collectors, etc., a very considerable amount of heat would be released which must then be dissipated by quenching with water. Thus water vapor is created and the capacity of the wet scrubbing column, as well as that of the duct work, must be provided for handling such vapor as well as air and other gases.

In the normal cupola operation, a charge door is provided approximately twenty feet above the bed plate of the cupola. The coke and iron are introduced through the charging door, usually by means of mechanical bucket charging equipment. The charging bucket is inside the cupola for a very brief time while the charge is being placed in the cupola and is then mechanically withdrawn and reloaded for the next charge. For example, a charging cycle might be performed in four to twelve minutes with the bucket being in the cupola for only one-fourth to one-half a minute, so that during the remainder of the time the cupola stack is open at the charging inlet.

The products of combustion emerging from the top of the charge will vary in temperature from approximately 200° F. with a very high iron-to-coke charging ratio, to as high as 1150° F. with a very low iron-to-coke charging ratio. The percent volume of carbon monoxide in the products of combustion as emitted from the top of the charge will vary from 10% with a high iron-to-coke charging ratio, to as much as 26% with a very low iron- to-coke charging ratio and with a corresponding variation in the latent heat content of the gases.

Most of these gases will burn very readily above the top of the charge within the cupola, resulting in a very high gas temperature which multiplies their volume. The thermal gas currents resulting greatly increase the problem of capturing the dust and fumes normally expelled from the top of the cupola stack. The problem of arresting such volumes of dust and fumes while at the same time providing for the escape of such fumes and dust in times of breakdown of equipment, has been long existent. There has long been a need for a structure in which the cupola stack may be left open in order to vent freely such dust and fumes in the event of power failure while at the same time providing equipment which will in the normal operation of the apparatus take care of such fumes and dust, removing them from the gases vented to the atmosphere.

An object of the present invention is to provide a structure enabling the products of combustion to be discharged directly through the top of the stack. Another object is to provide a gas curtain which automatically diverts the products of combustion through a conduit leading to a wet scrubbing apparatus whereby the cleaned gases may be discharged to the atmosphere, etc. Yet another object is to provide in such a structure means for reusing a portion of the cleansed gases in the forming of the gas curtain across the stack.

A still further object is to utilize cleansed products of combustion having low free oxygen content in the forming of the gas curtain which normally diverts the products of combustion within the cupola toward scrubbing apparatus for cleansing. Yet another object is to provide improved cleansing apparatus in the combination shown. Other specific objects and advantages will appear as the specification proceeds.

The invention is shown, in an illustrative embodiment, by the accompanying drawings, in which—

Figure 1 is a side view in elevation of apparatus embodying my invention, part of the apparatus being shown in vertical section; and Fig. 2, a broken top plan view of the apparatus.

In the illustration given, 10 designates a generally upright open-ended stack or cupola which may be of any suitable type or construction. In view of the well-known construction of a cupola, a detailed description is herein believed unnecessary. The cupola on one side is provided with the usual charging door opening 11, and the cupola, as stated, is open at its top 12. A charging bucket 13 is shown within the cupola as entering the opening 11 for placing a charge within the cupola.

In the practice of the present invention, we provide an inwardly-extending flange 14 which extends inwardly and downwardly at a point aligned with the inlet 11. In order to permit an adequate downward velocity with a minimum volume of what may be termed "control air," the flange is extended into the cupola as far as is practicable but permitting ample clearance for the charging bucket operation, and the flange thus reduces the area of the stack through which this control velocity is maintained.

To further reduce the tendency of the hot rising products of combustion to penetrate the control air and pass out of the charging door or up the stack, we provide a compensating gas curtain of relatively high velocity by directing the gas around the circumference of the back half of the cupola and immediately beneath the flange 14 and so directed diagonally downwardly and toward the center of the cupola as to meet another curtain of compensating air introduced from a point below the charging door sill and directed at the proper angle upwardly and toward the center line of the cupola. A hood or manifold 15 is provided with a discharge port 16 extending around the back half of the cupola and discharges a gaseous curtain downwardly in the direction of the arrow. A second hood or manifold 17 has a discharge port 18 directing a gaseous curtain upwardly around the front half of the cupola so that the gaseous curtains meet centrally of the cupola to provide an air or gas gate to block upward passage of the produces of combustion.

Communicating with the cupola interior just below the gas curtain, is an inclined withdrawal duct or conduit 19 extending laterally and upwardly at an inclination of about 45°. Any particles of coke or ash carried out of the cupola, which may settle out of the gas stream within the inclined exhaust duct 19, tend to gravitate back into the cupola stack.

Approximately half of the control volume may be introduced through the compensating air nozzles or gas nozzles, the other half of the volume being permitted to enter the charging door or come down the stack. For example, if the products of combustion are equivalent to a volume of 10,000 cubic feet of air per minute and 20,000 cubic feet of control gas is required to maintain an average velocity of 500 feet per minute through the control area (just within the charging door), we would then introduce 10,000 cubic feet per minute of the control air through the compensating ports, permitting the other 10,000 cubic feet per minute to come in through the charging door or down the stack to carry all 20,000 cubic feet per minute of control volume, together with the 10,000 cubic feet per minute of products of combustion into the exhaust conduit 19 at the back of the cupola. In this case, the exhaust equipment, the wet scrubbing apparatus, the ducts and combustion chambers, would then be set up so that an equivalent 30,000 cupic feet of air per minute is positively drawn out of the cupola through the exhaust opening and the curtain of compensating gas would stop the ascent of any high velocity rising gases, reversing their direction so that they could be readily captured or mingled with the control air and conveyed through the exhaust duct 19.

The great advantage in the construction that has been described can be better appreciated if it is realized that in order to capture the products of combustion by closing the top of the cupola and exhausting all products of combustion and control air entering the charging door opening with the same size cupola and quantity of products of combustion, it would require exhausting approximately 100,000 cubic feet of gas per minute from the top of the cupola to prevent the gas from escaping through the charging door opening.

We have further discovered that the compensating gas curtain which prevents the penetration of the rising hot gas may be itself be formed of gas recirculated from the withdrawn products of combustion, which products of combustion are preferably passed through a dust collector or wet scrubbing apparatus to remove fumes and particulate matter. Such gases are low in free oxygen because they are largely contained with the products of combustion. They also contain a considerable percentage of water vapor which has a high specific heat in relation to air and have a very strong ignition quenching capacity, so that when it is not desired to burn the combustible elements of the products of combustion, recirculated gases from the wet scrubbing apparatus or collector may be introduced through the compensating gas ports forming the curtain and thus prohibit ignition of the gas.

In the specific illustration given, we provide a depending chamber 20 in communication with the exhaust duct 19 and having an ash ejector 21 at the bottom thereof, and we connect this chamber through pipe 22 with the wet scrubbing column or collector 23. Such a collector may be of the type shown in our Patent No. 2,197,595. The column is provided with baffles and water or other liquid is introduced in the upper portion thereof to meet the rising gaseous column and separate therefrom the particulate matter, fumes, etc. If desired, the column 23 may be provided with a partition wall 24 and the gas may be passed from the lower chamber through a duct 25, fan housing 26, and into an upper compartment 27 from which a portion of the cleansed gas may be discharged through the outlet 28 into the atmosphere. We prefer to return a portion of the cleansed gases from the fan housing through the pipe 29 and fan 30 and thence through the return duct 31 to the column 10 for forming the gas curtain therein.

In the specific illustration given in Fig. 2, a pair of cupolas 10 are shown and the duct 31 is divided into two branch ducts 32, which in turn are divided and lead to opposite sides of the cupola for communication with the hoods or manifolds 15 and 17. For example, duct 32, as shown in Fig. 2, is divided into ducts 34 and 35. Duct 34 communicates with hood 17, and duct 35 communicates with hood 15. It will be understood that any number of cupolas may be employed, with one or more dust collectors or scrubbing units 23.

Operation

In the operation of the process and structure, a cupola 10 is charged with coke and iron, etc. As the products of combustion rise and increase in volume, air or gas is supplied to the hoods 15 and 17 and a gaseous curtain is formed across the interior of the cupola near the bottom of the charging door. The curtain, together with control air, tends to turn inwardly and move with the products of combustion up the inclined exhaust duct 19. Some ash and other particulate matter falls out of the gases as they pass up the duct and are directed back into the cupola. The hot gases and control air, etc. then pass downwardly through chamber 20 and thence through duct 22 into the lower portion of the column 23, entering the column tangentially and moving upwardly through the column, where they meet water distributed over vanes, plates and rings so as to thoroughly wash the rising gases. From the top of the tower 23 or from the fan housing as shown in the specific illustration given, cleansed gases, low in free oxygen and containing a considerable percentage of water vapor, are drawn off through the duct 31 and thence through ducts 32 to separate cupolas 10. The gas is directed into the hoods 15 and 17 of either cupola to form the inwardly-extending gaseous curtain already described. The gaseous curtain thus formed is advantageous because of the low content in free oxygen and because of the presence of water vapor which has a very strong ignition-quenching capacity.

In some instances, the rising products of combustion contain combustibles which are visible gases and cannot be completely arrested in a dust collector, and it is desired to burn these gases. If such visible gases are expelled, they would show up as smoke from the discharge of the collector. When such visible smoke is apparent, atmospheric air can be introduced through the compensating ports forming the curtain and thus provide oxygen for the complete combustion of such materials. If desired, an inextinguishable burner 36 may be placed at the exhaust opening in the cupola at that point at which the sensible heat in the products of combustion and the proportion of control air provide the best conditions for ignition.

It will be observed that in the operation of this apparatus, the top of the cupola stack is left open. If something should happen to endanger the costly equipment described, such as, for example, power failure, the equipment is automatically protected because the fans are shut off and the curtain and the exhaust suction cease to exist, thus allowing the products of combustion to rise through the cupola in exactly the same fashion as occurs in normal cupola operation. For the period of time of such a shutdown of the exhaust equipment, the gases, dust, etc. would be expelled from the top of the cupola the same as now occurs in the operation of a cupola not having this equipment. There would be no stoppage in the melting operation. This would continue as usual and there would be no hazard of burning out or warping plates in the dust collector and there would be ample time without hazard or destruction to repair or correct any power or water failure, etc. If desired, automatic means may be provided for breaking the current flow to the fans in the event of water failure or other failure in the operation of the system.

While, in the foregoing specification, we have set forth a specific structure in considerable detail for the purpose of illustrating one embodiment of the invention, it will be understood that such details of structure may be varied widely by those skilled in the art without departing from the spirit of our invention.

We claim:

1. In apparatus of the character described, a generally upright open-ended cupola having a charging opening on one side intermediate the ends thereof, a wet scrubbing device for cleansing gases withdrawn from said cupola, a withdrawal duct communicating with the interior of said cupola below said charging opening and with the inlet of said wet scrubbing device, manifolds about said cupola communicating with the interior thereof and positioned thereon to direct a curtain of fluid thereacross intermediate said withdrawal duct and said charging opening, a return duct leading from the outlet of said scrubbing device to said manifolds and communicating therewith, and blower means for forcing fluid through said return duct and manifolds for forming a curtain of fluid across said cupola.

2. The apparatus of claim 1 in which a pair of manifolds are provided one above the other and on opposite sides of said cupola in facing relation for directing said curtain of fluid angularly across said cupola.

3. In apparatus of the character described, a generally upright open-ended cupola having a charging opening on one side intermediate the ends thereof, a withdrawal duct communicating with the interior of said cupola below said charging opening for withdrawing gases therefrom, manifolds about said cupola communicating with the interior thereof and positioned thereon to direct a curtain of fluid thereacross intermediate said withdrawal duct and said charging opening, a second duct communicating with said manifolds, and blower means for forcing fluid through said second duct and manifolds for forming a curtain of fluid across said cupola.

4. The apparatus of claim 3 in which a pair of manifolds are provided one above the other and on opposite sides of said cupola in facing relation for directing said curtain of fluid angularly across said cupola.

5. In a structure of the character described, a generally upright open-ended stack through which gases rise, said stack being provided with an opening intermediate the ends thereof and on one side, a withdrawal duct communicating with the interior of said stack below said opening, and manifolds about said stack communicating with the interior thereof and positioned thereon to direct a gaseous curtain thereacross interposed between said withdrawal duct and said opening, said manifolds being adapted to have a gaseous fluid forced thereinto under pressure for discharging a relatively high velocity curtain of gas across said stack.

6. The structure of claim 5 in which said withdrawal duct extends upwardly and laterally from said stack.

7. The structure of claim 5 in which a pair of manifolds are provided one above the other and on opposite sides of said stack in facing relation for directing the curtain of gas angularly across said stack.

8. In a structure of the character described, a generally upright open-ended stack through which gases rise, said stack having on one side thereof and intermediate its ends an opening, a withdrawal duct extending laterally from said stack and communicating with the interior thereof at a point generally below and opposite said opening for withdrawing gases rising in said stack, manifolds for receiving a gaseous fluid under pressure, one being positioned adjacent said duct and thereabove and another being positioned adjacent said opening and therebelow, said stack providing ports therethrough communicating with said manifolds, the ports communicating with each of said manifolds being oriented respectively along lines extending therebetween across the interior of said stack for discharging a gaseous curtain angularly across said stack intermediate said duct and opening.

References Cited in the file of this patent

UNITED STATES PATENTS

| Number | Name | Date |
|---|---|---|
| 32,840 | Mueller | July 16, 1861 |
| 1,123,232 | Brassert et al. | Jan. 5, 1915 |
| 1,884,048 | McClosky | Oct. 25, 1932 |
| 1,884,088 | Miller | Oct. 25, 1932 |
| 2,064,532 | Gilbert | Dec. 15, 1936 |
| 2,192,191 | Hayes | Mar. 5, 1940 |
| 2,345,502 | Reece | Mar. 28, 1944 |
| 2,457,083 | Jordan | Dec. 21, 1948 |